(12) United States Patent
Abu Saude et al.

(10) Patent No.: US 11,237,687 B2
(45) Date of Patent: Feb. 1, 2022

(54) SYSTEMS AND METHODS FOR TOUCH DETECTION USING ELECTRIC FIELD TOMOGRAPHY THROUGH RESISTIVE SHEET

(71) Applicant: Samsung Electronics Co., Ltd., Suwon-si (KR)

(72) Inventors: Mohammad Abu Saude, Sunnyvale, CA (US); Sergio Perdices-Gonzalez, Sunnyvale, CA (US); Santiago Ortega-Avila, Sunnyvale, CA (US); Pedro Martinez-Lopez, Sunnyvale, CA (US); Sajid Sadi, San Jose, CA (US); Ernest Rehmatulla Post, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/408,203

(22) Filed: May 9, 2019

(65) Prior Publication Data

US 2020/0241670 A1 Jul. 30, 2020

Related U.S. Application Data

(60) Provisional application No. 62/796,741, filed on Jan. 25, 2019.

(51) Int. Cl.
*G06F 3/045* (2006.01)
*G06F 3/041* (2006.01)

(52) U.S. Cl.
CPC .......... *G06F 3/045* (2013.01); *G06F 3/04164* (2019.05); *G06F 2203/04113* (2013.01)

(58) Field of Classification Search
CPC ................ G06F 3/045; G06F 3/04164; G06F 2203/04113
See application file for complete search history.

(56) References Cited

U.S. PATENT DOCUMENTS 5,886,687 A * 3/1999 Gibson ................... G06F 3/044
178/18.06
6,891,382 B2 5/2005 Post et al.
(Continued)

FOREIGN PATENT DOCUMENTS

| EP | 0249417 B1 | 9/1992 |
| JP | 2013-178848 A | 9/2013 |
| KR | 10-2018-0103400 A | 9/2018 |

OTHER PUBLICATIONS

Yang Zhang, et al., "Electrick: Low-Cost Touch Sensing Using Electric Field Tomography", ACM, Proceedings of the 2017 CHI Conference on Human Factors in Computing Systems, May 6-11, 2017, Denver, CO, 14 pages.
(Continued)

*Primary Examiner* — Kwang-Su Yang (57) ABSTRACT

The present disclosure includes systems and methods for touch sensing. An electronic device includes a resistive sheet that is optically transmissive, a number of electrodes electrically coupled to the resistive sheet, the electrodes disposed at an edge of the resistive sheet and spaced apart at predetermined intervals, and a processor coupled to the number of electrodes. The processor is configured to generate, at a first of the electrodes, a first drive signal, generate, at a second of the electrodes, a second drive signal, each drive signal having a different frequency, measure an output of at least one of the electrodes, and determine, based on the output, a location of a touch input on the resistive sheet.

20 Claims, 11 Drawing Sheets

(56) References Cited

U.S. PATENT DOCUMENTS

| | | | |
|---|---|---|---|
| 7,498,621 B2 * | 3/2009 | Seitz | G01J 9/00 |
| | | | 257/222 |
| 7,952,567 B2 | 5/2011 | Aroyan et al. | |
| 8,890,849 B2 | 11/2014 | Christiansson et al. | |
| 10,025,440 B2 | 7/2018 | Tan | |
| 2002/0149572 A1 * | 10/2002 | Schulz | G06F 3/044 |
| | | | 345/174 |
| 2005/0076824 A1 * | 4/2005 | Cross | G06F 3/045 |
| | | | 116/205 |
| 2008/0309625 A1 | 12/2008 | Krah et al. | |
| 2008/0316182 A1 | 12/2008 | Antila et al. | |
| 2009/0127003 A1 * | 5/2009 | Geaghan | G06F 3/0416 |
| | | | 178/18.03 |
| 2009/0277696 A1 * | 11/2009 | Reynolds | G06F 3/0418 |
| | | | 178/18.06 |
| 2010/0127717 A1 * | 5/2010 | Cordeiro | G06F 3/0416 |
| | | | 324/678 |
| 2011/0285664 A1 * | 11/2011 | Yang | G06F 3/045 |
| | | | 345/174 |
| 2012/0001866 A1 | 1/2012 | Rapakko | |
| 2012/0038583 A1 | 2/2012 | Westhues et al. | |
| 2018/0260067 A1 | 9/2018 | Choi | |

OTHER PUBLICATIONS

International Search Report dated Apr. 28, 2020 in connection with International Patent Application No. PCT/KR2020/001160, 4 pages.

* cited by examiner

SYSTEMS AND METHODS FOR TOUCH DETECTION USING ELECTRIC FIELD TOMOGRAPHY THROUGH RESISTIVE SHEET

CROSS-REFERENCE TO RELATED APPLICATION(S) AND CLAIM OF PRIORITY

This application claims priority under 35 U.S.C. § 119(e) to U.S. Provisional Patent Application No. 62/796,741 filed on Jan. 25, 2019. The above-identified provisional patent application is hereby incorporated by reference in its entirety.

TECHNICAL FIELD

This disclosure relates generally to touch sensors. More specifically, this disclosure relates to the use of a resistive sheet to perform touch detection using multiple electric field tomography.

BACKGROUND

Touch screens are being integrated into increasingly numerous types of electronic devices. Current touch screen technologies, however, are expensive to produce, and scaling up the size of touch screens for devices such as televisions, white boards, or the like is prohibitively costly. Furthermore, current touch screen technologies are manufactured onto rigid substrates such as glass, and are not adapted to use in flexible or curved screens.

SUMMARY

Embodiments of the present disclosure provide systems and methods for touch detection using electric field tomography through a resistive sheet.

In one embodiment, an electronic device is disclosed. The electronic device includes a resistive sheet that is optically transmissive, a number of electrodes electrically coupled to the resistive sheet, the electrodes disposed at an edge of the resistive sheet and spaced apart at predetermined intervals, and a processor coupled to the number of electrodes. The processor is configured to generate, at a first of the electrodes, a first drive signal, generate, at a second of the electrodes, a second drive signal, each drive signal having a different frequency, measure an output of at least one of the electrodes, and determine, based on the output, a location of a touch input on the resistive sheet.

In a second embodiment, a method is disclosed. The method comprises generating, by a processor at a first electrode of a number of electrodes, a first drive signal, the number of electrodes electrically coupled to an optically transmissive resistive sheet, the electrodes disposed at an edge of the resistive sheet and spaced apart at predetermined intervals, generating, by the processor at a second of the electrodes, a second drive signal, each drive signal having a different frequency, measuring an output of at least one of the electrodes, and determining, based on the output, a location of a touch input on the resistive sheet.

In a third embodiment, a non-transitory computer-readable medium embodying a computer program is disclosed. The computer program comprises computer readable program code that, when executed, causes at least one processor to generate, at a first electrode of a number of electrodes, a first drive signal, the number of electrodes electrically coupled to an optically transmissive resistive sheet, the electrodes disposed at an edge of the resistive sheet and spaced apart at predetermined intervals, generate, at a second of the electrodes, a second drive signal, each drive signal having a different frequency, measure an output of at least one of the electrodes, and determine, based on the output, a location of a touch input on the resistive sheet.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that touch-sensitive interfaces are becoming increasingly embedded into everyday life, and that touch screens in particular are a useful interface for a myriad of electronic devices, ranging from smart phones and personal computers to smart appliances including refrigerators, washing machines, and the like. Present touch screen technologies typically use capacitive sensors that include a dense grid of perpendicularly oriented contacts. These structures provide high resolution touch sensing, but are very costly per square inch. As a result, scaling such touch sensing technologies up to sizes larger than mobile device screens is cost prohibitive.

The present disclosure includes embodiments of a touch sensing system that scales effectively to large sizes at a lower cost than existing technologies. These systems can be used as transparent touch-sensitive overlays for large active devices such as televisions and smart appliance screens. Additionally, these systems can be used as transparent touch-sensitive overlays for large passive surfaces such as smart whiteboards. Embodiments of the present disclosure contemplate voltage-based touch sensing systems that use a relatively small number of inputs and outputs to a sheet of highly resistive material (for example, one input/output electrode at each corner of a highly resistive sheet) in order to detect, at the outputs, a change in voltage in input signals (or drive signals) due to a user's touch on the highly resistive sheet. When a user touches the highly resistive sheet, some amount of signal is shunted through the user's body to ground via capacitive coupling between the user's body (e.g., the user's finger) and the highly resistive sheet, thereby reducing the voltage of that signal at the output. The amount of attenuation in an input signal is related to the distance of the touch from both the input and the output. Different frequency signals can be used for each input to allow the system to differentiate between each input signal when processing output signals. Accordingly, with at least two inputs and two outputs, a position of a touch can be determined based on the amount of attenuation of voltage of each of the input signals at each of the output electrodes.

Embodiments of the present disclosure also allow for touch sensing on flexible screens. A highly resistive sheet used with systems of the present disclosure can be made of a flexible material, and does not require attachment to a rigid material (such as glass). Accordingly, the touch sensing systems of the present disclosure can be applied to curved screens or flexible screens for which current touch sensing technologies are not appropriate.

The embodiments of the present disclosure also have desirable optical characteristics. For example, current touch sensing technologies using dense grids of contacts reduce the amount of light that can be transmitted from the underlying device through the touch sensing systems. Embodiments of the present disclosure use an optically transmissive resistive sheet having relatively uniform optical characteristics throughout, with electrical contacts only at the edges of the resistive sheet. Accordingly, the electronics of the disclosed systems reduce interference with the optical characteristics of the device over which they are placed.

Figure 1A:
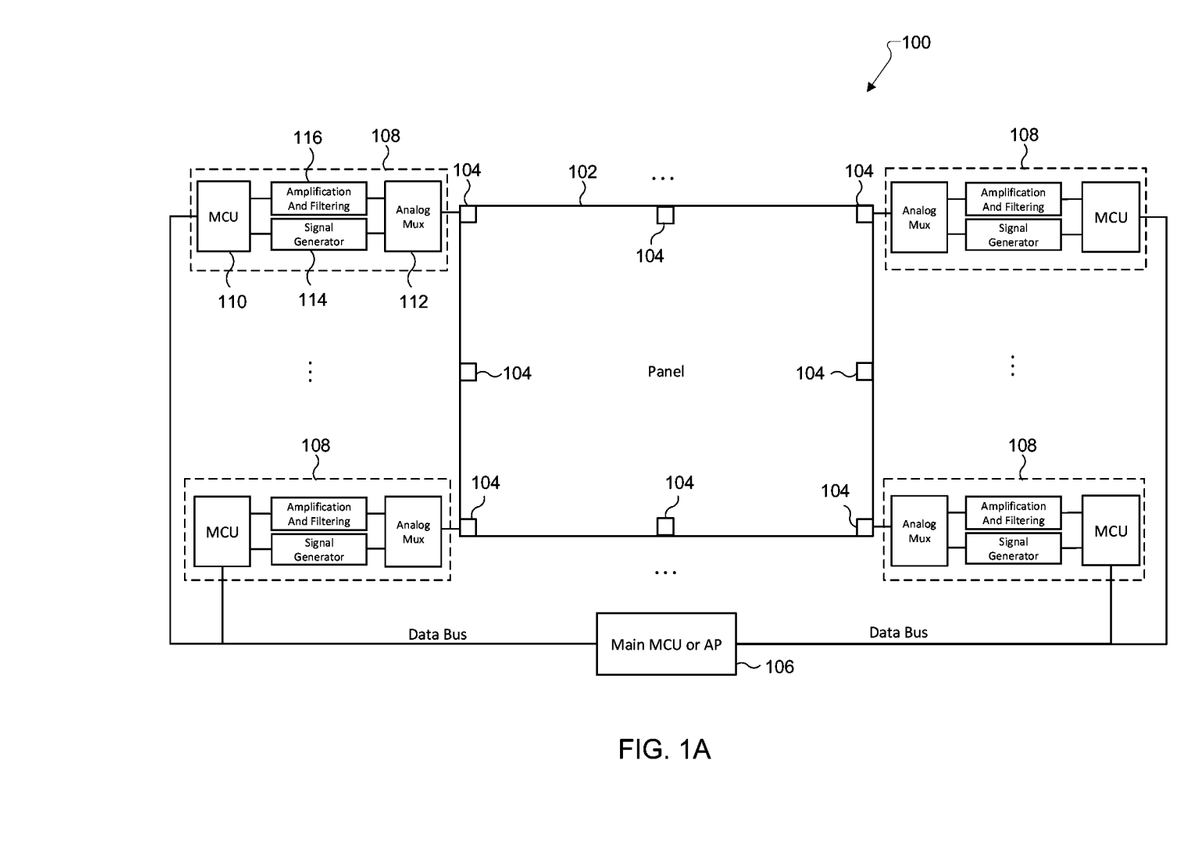
FIGS. 1A and 1B illustrate example touch sensing systems according to this disclosure.
Figure 1B:
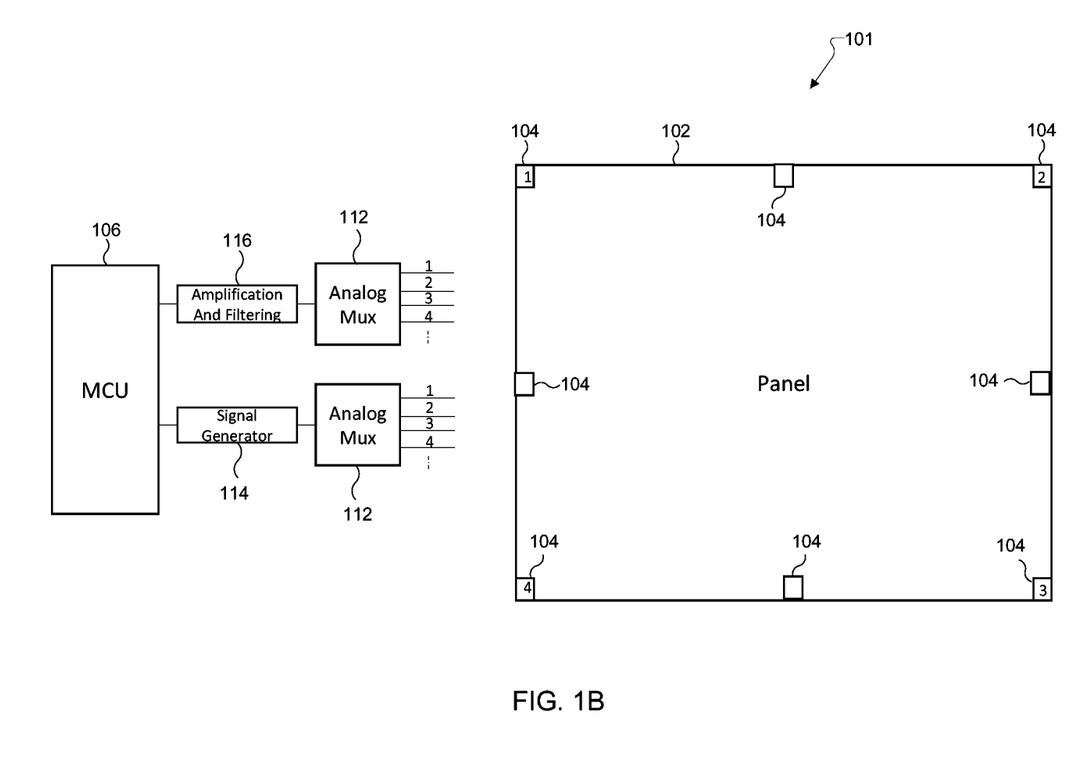

FIGS. 1A and 1B illustrate example touch sensing systems 100 and 101 according to this disclosure. For example, the touch sensing systems 100 and 101 could be overlaid on an active device such a television, a monitor, or the like, or over a passive object such as a whiteboard to add touch sensing capability to such active devices or passive objects. As will be further described below, when a touch sensing system 100 or 101 is overlaid on an active device, an active shield may be placed between the touch sensing system 100 and the active device to reduce noise created by the active device and to reduce capacitive leak between the touch sensing system 100 and the active device.

As shown in FIG. 1A, the touch sensing system 100 includes a highly resistive sheet 102, electrodes 104, a main processor (or controller or application processor (AP)) 106 such as a microcontroller, and one or more optional sub-controllers 108. The sub-controllers 108 can include a processor (or controller) 110, multiplexer 112, signal generator 114, and signal processing components 116. The highly resistive sheet 102 can be covered by a covering material, such as glass or polyethylene terephthalate (PET) plastic that provides protection from damage to the highly resistive sheet 102.

The processor 106 can include one or more processors, microcontrollers, or other processing devices that control the overall operation of the touch sensing system 100. For example, the processor 106 could control the generation of input signals and the processing of output signals for the touch sensing system 100. In some embodiments, the processor 106 includes at least one microprocessor or microcontroller. The processor 106 can be dedicated to the touch sensing system 100, or can be a multipurpose processor that also controls an electronic device, such as a television, monitor, or the like, of which the touch sensing system 100 is a component.

The processor 106 is coupled to the sub-controller 108 by a data bus. The sub-controllers 108 can perform functions that support both signal input to electrodes 104 and signal output from electrodes 104. Such functions include digital-to-analog or analog-to-digital signal conversion, signal filtering to eliminate noise, signal amplification, or the like. The sub-controllers 108 can control a multiplexer 112 to connect an input or an output circuit to an electrode 104. The sub-controllers 108 can use signal generators 114 to generate and digitize output signals. The sub-controllers 108 can use signal processing components 116, such as amplifiers and filters, to process input signals before analog-to-digital conversion.

The highly resistive sheet 102 can be comprised of a number of materials, including poly(3,4-ethylenedioxythiophene) polystyrene sulfonate (PEDOT:PSS), indium tin oxide (ITO), carbon nanotubes (CNT), or carbon-based dispersions. In some embodiments, the highly resistive sheet has a sheet resistance in the kiloohms per square (kΩ/sq.) or megaohms per square (MΩ/sq.) range. The highly resistive sheet 102 is transmissive to visible light, and has relatively uniform light transmission characteristics. In some embodiments, the highly resistive sheet 102 has an index of refraction that closely matches the index of refraction of the protective covering layer.

The electrodes 104 provide an electrical interface between the processor 106 or sub-controller 108 and the highly resistive sheet 102. The electrodes 104 can be formed from any suitable conductive material, such as copper, silver loaded epoxy, silver loaded structural adhesive, silver loaded paint, ITO, or tricresyl phosphates (TCPs) such as highly conductive variants of PEDOT:PSS. The electrodes 104 are suitable for use with alternating current (AC) signals. In some embodiments, each electrode 104 is either a dedicated input electrode or a dedicated output electrode. In other embodiments, each electrode 104 can serve as either an input or an output, and the processor 106 or sub-controller 108 determines whether to input a signal via a particular electrode 104 or to measure an output via the particular electrode 104. In some embodiments, more or fewer electrodes 104 can be used. As the number of electrodes 104 is increased, the accuracy and sensitivity of the system improves.

Although FIG. 1A illustrates an example of a touch sensing system, various changes may be made to FIG. 1A. For example, various components in FIG. 1A could be combined, further subdivided, or omitted and additional components could be added according to particular needs. As a particular example, some or all functions of the sub-controllers 108 could be included in the processor 106. In addition, the touch sensing system of FIG. 1A could be used with any suitable active or passive display device, and FIG. 1A does not limit this disclosure to any underlying display system.

Referring now to FIG. 1B, a touch sensing system 101 is illustrated that is an embodiment of the touch sensing system 100 in which a single processor 106, such as a microcontroller, controls the functions of the whole system. In this embodiment, rather than using a sub-controller 108 to handle the inputs or outputs of each electrode 104, the single processor 106 performs the functions that support signal input to electrodes 104 and signal output from electrodes 104. The processor 106 can control one or more multiplexers 112 to connect an input or an output circuit to each electrode 104, respectively. For example, signal line 1 from a multiplexer 112 connects to the electrode 104 labeled 1, signal line 2 from a multiplexer 112 connects to the electrode 104 labeled 2, etc. The processor 106 can use signal generator 114 to generate and digitize output signals, and can use signal processing components 116, such as amplifiers and filters, to process input signals before analog-to-digital conversion.

In other respects, the resistive sheet 102 and electrodes 104 are the same as those disclosed above with respect to FIG. 1A. Although FIG. 1B illustrates an example of a touch sensing system, various changes may be made to FIG. 1B. For example, various components in FIG. 1B could be combined, further subdivided, or omitted and additional components could be added according to particular needs. As a particular example, some or all functions of the signal generator 114 and signal processing components 116 could be included in the processor 106. In addition, the touch sensing system of FIG. 1B could be used with any suitable active or passive display device, and FIG. 1B does not limit this disclosure to any underlying display system.

Figure 2:
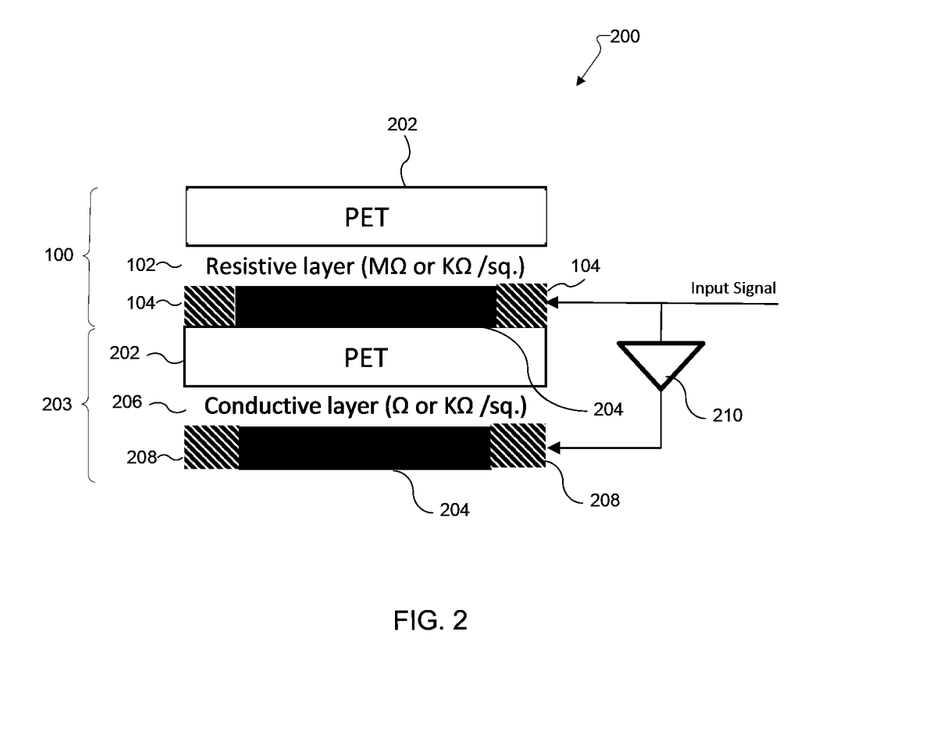
FIG. 2 illustrates an example sensor structure including the touch sensing system and an optional shielding layer according to embodiments of the present disclosure.

FIG. 2 illustrates an example sensor structure 200 including the touch sensing system 100 and an optional shielding layer 203 according to illustrative embodiments of the present disclosure. The embodiment of FIG. 2 includes example materials, but it is understood that other suitable materials may be substituted. For example, PET may be substituted for glass or other suitable plastics. Copper may be substituted for other suitable conductors such as silver loaded epoxy, silver loaded structural adhesive, silver loaded paint, ITO, or tricresyl phosphates (TCPs) such as highly conductive variants of PEDOT:PSS. Optically clear adhesive (OCA) may be substituted for other suitable bonding agents. The sensor structure 200 is placed over top of an active or passive device (such as a monitor, television, whiteboard, laptop track pad, other display, or other non-display device) in order to add touch sensing functionality to the device.

As illustrated in FIG. 2, the sensor structure 200 comprises a highly resistive sheet 102 sandwiched between a cover layer 202 and a shielding layer 203. In some embodiments, the cover layer 202 is comprised of optically transmissive PET. The cover layer 202 can also be comprised of other optically transmissive materials such as glass. The optical transmissiveness of the materials allows any information displayed below the sensor structure 200 to be visible through the sensor structure 200, preferably with minimal distortion or optical attenuation.

PET has a refractive index that relatively closely matches the refractive index of PEDOT:PSS, and accordingly the use of PET as a cover layer 202 for a highly resistive sheet 102 comprised of PEDOT:PSS results in low amounts of reflection and haze from the transmission of light through the interface between the highly resistive sheet 102 and the cover layer 202. Additionally, PEDOT:PSS obtains its highest sheet resistance when it is in the order of tens of nanometers thick, and it also obtains its highest transmissiveness of visible light in this same range of thickness. ITO obtains its highest sheet resistance when it is in the order of hundreds of nanometers thick, but obtains its highest transmissiveness of visible light at around 80 nanometers. PEDOT:PSS also has relatively uniform transmissiveness across the spectrum of visible light as compared to ITO, which has a higher amount of variance in transmissiveness of light at wavelengths below 1000 nm.

Regardless of the materials used for the highly resistive sheet 102 and the cover layer 202, the highly resistive sheet 102 and the cover layer 202 are each comprised of a homogenous material. In particular, because the electrodes 104 are placed around the edges of the highly resistive sheet 102 (as illustrated in FIGS. 1A and 1B), they do not interfere with the optical characteristics of the highly resistive sheet 102. Accordingly, there is relatively uniform visible light transmission through each of the highly resistive sheet 102 and the cover layer 202.

The highly resistive sheet 102 can, in some embodiments, be bonded to the shielding layer 203 with an OCA 204. The electrodes 104 can be placed below the highly resistive sheet 102 in a common layer with the OCA 204 and electrically interfaced with the highly resistive sheet 102. The shielding layer 203 is an active shield that protects the touch sensing system 100 from possible shunting of input signals into the device on which the sensor structure 200 is placed. For example, if the touch sensing system 100 is placed over top of an active electronic device such as a television or monitor without a shielding layer 203, the electronics of the underlying device could cause some part of input signals to the highly resistive sheet 102 to be shunted into the underlying device. This could also occur with passive underlying devices (such as a metallic device) that happen to be sufficiently electrically conductive. This shunting could interfere with the below-described detection of touch on the touch sensing system 100. In embodiments that do not use a shielding layer 203 (for example, embodiments with passive underlying devices such as whiteboards or windows), the highly resistive sheet 102 of the touch sensing system 100 is directly bonded to the underlying device via the OCA 204.

The shielding layer 203 can be comprised of a second cover layer 202, a low-resistance conductive sheet 206, electrodes 208 that are electrically interfaced with the low-resistance conductive sheet 206, and a second OCA 204 that bonds the shielding layer 203 (and accordingly the sensor structure 200) to the underlying device. The low-resistance conductive sheet 206 can have a significantly lower sheet resistance than the highly resistive sheet 102. For example, the low-resistance conductive sheet 206 can have a sheet resistance on the order of ohms per square (Ω/sq.) to kilo-ohms per square (kΩ/sq.). In embodiments using the shielding layer 203, the same input signals are applied to both the low-resistance conductive sheet 206 (via the electrodes 208) and the highly resistive sheet 102 (via the electrodes 104). For example, a voltage follower 210 can be used to mirror the signal input to each electrode 104 to a corresponding electrode 208 of the shielding layer 203. This protects the signal input to the highly resistive sheet 102 from being shunted into the underlying device through the shielding layer 203.

Figure 3:
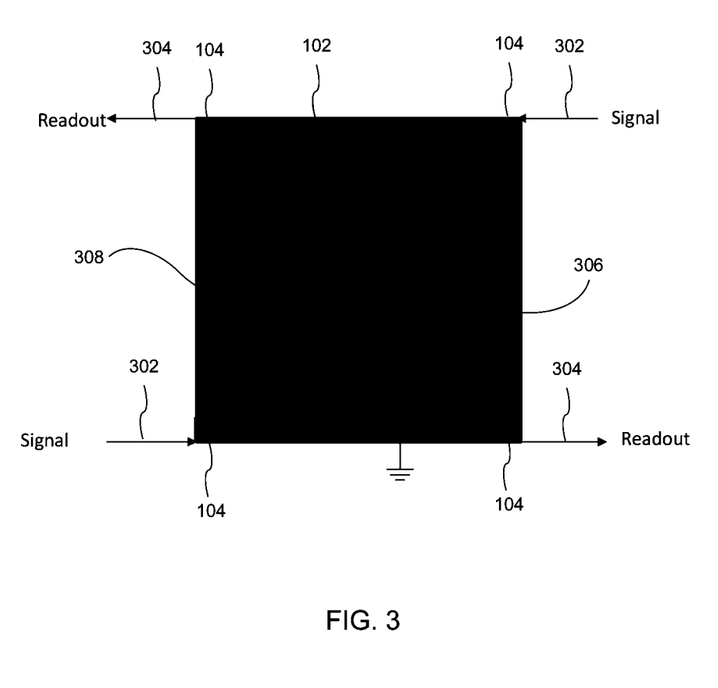
FIG. 3 illustrates a sensing principle of the touch sensing system according to embodiments of the present disclosure.

FIG. 3 illustrates a sensing principle of the touch sensing system 100 according to illustrative embodiments of the present disclosure. In the embodiment of FIG. 3, the touch sensing system 100 has only four electrodes 104 that are connected at the four corners of the highly resistive sheet 102. It is understood that in other embodiments, more electrodes 104 could be placed around the edge of the highly resistive sheet 102, and additional inputs and outputs could be connected to those electrodes 104. In such embodiments, all electrodes would be spaced at predetermined intervals around the edge of the highly resistive sheet 102, such that each electrode 104 is directly opposite from another electrode 104 that is on an opposite edge of the highly resistive sheet 102. This could, for example, increase the accuracy of the touch sensing system 100 by providing more data points with which to perform touch location determination, as described below.

Input signals 302 are applied to two of the electrodes 104 that are placed at different (e.g., opposite) corners of the highly resistive sheet 102. In some embodiments, the input signals 302 can include at least two different input signals (e.g., having different frequencies). Outputs 304 are read from the remaining two electrodes 104 that are likewise at different (e.g., opposite) corners of the highly resistive sheet 102 from each other. Each of the input signals is an AC signal that has a distinct frequency. When a user touches the highly resistive sheet 102 at the point 306, a small current from each of the input signals 302 is capacitively coupled (i.e., shunted) to ground through the user's body. This results in a current gradient 308 and alters the voltage at the readout electrodes 104. In some embodiments, the input and readout electrodes can be alternated at a predetermined frequency.

Figure 4:
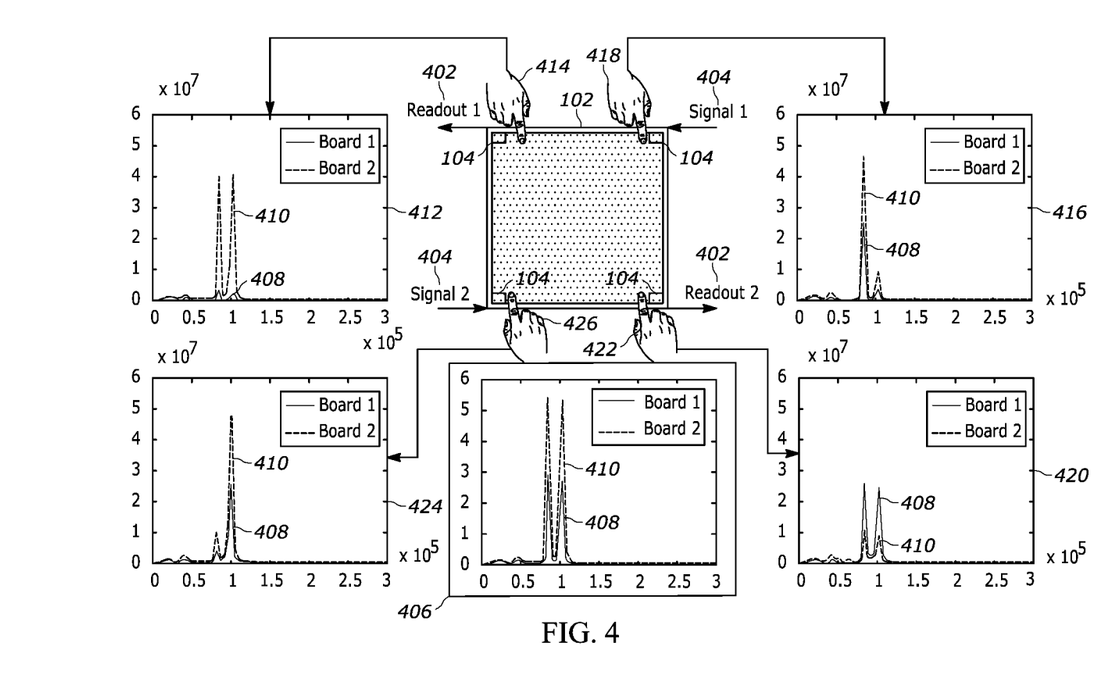
FIG. 4 illustrates an example of the sensing principle of the touch sensing system according to embodiments of the present disclosure.

FIG. 4 illustrates an example of the sensing principle of the touch sensing system 100 according to illustrative embodiments of the present disclosure. In the embodiment illustrated in FIG. 4, the touch sensing system 100 has only four electrodes 104 that are connected at the four corners of the highly resistive sheet 102. It is understood that in other embodiments, more electrodes 104 could be placed around the edge of the highly resistive sheet 102, and additional inputs and outputs could be connected to those electrodes 104. The example of FIG. 4 illustrates signal readouts in 5 cases: when the user is not touching the highly resistive sheet 102, and when the user is touching near each of the four corners of the highly resistive sheet 102. In each of the graphs 406, 412, 416, 420, and 424, it is understood that the numerical scales of the x-axis and y-axis are merely exemplary and does not indicate any particular value of the illustrated signals.

The graph 406 illustrates the default case in which there is no touch on the highly resistive sheet 102. Accordingly, the graph 406 illustrates the output signal readouts 402 of the input signals 404 without any shunting of the signals. The y-axis of the graph 406 represents the amplitude of the voltage of the readout signals 402, and the x-axis of the graph 406 represents the frequency of the readout signals 402. The graph 406 includes two graph lines, each of which represents one of the readout signals 402. Graph line 408 represents the readout signal 402 at Readout 1, and graph line 410 represents the readout signal 402 at Readout 2. The input signals 404 each have a distinct frequency, which is unchanged at the readout. In the example of FIG. 4, the higher frequency signal is Signal 1, and the lower frequency signal is Signal 2. Additionally, in this case, where there is no touch input on the highly resistive sheet 102, both graph lines 408 and 410 indicate that there is no (or very little) attenuation of either input signal 404.

The graph 412 illustrates the case in which there is a touch 414 on the highly resistive sheet 102 near the electrode 104 from which the readout signal 402 Readout 1 is measured. As in graph 406, graph line 408 represents the readout signal 402 at Readout 1, and graph line 410 represents the readout signal 402 at Readout 2. The Readout 1 signal, as shown by graph line 408, is highly attenuated by the touch 414, while the Readout 2 signal, as shown by graph line 410, is mostly unaffected by the touch 414. That is, touching near the Readout 1 electrode 104 shunts almost all of the voltage detected at the Readout 1 electrode 104.

The graph 416 illustrates the case in which there is a touch 418 on the highly resistive sheet 102, near the electrode 104 at which the input signal 404 Signal 1 is input. As in graph 406, graph line 408 represents the readout signal 402 at Readout 1, and graph line 410 represents the readout signal 402 at Readout 2. Both the Readout 1 and Readout 2 signals are highly attenuated at the higher frequency (representing input signal 404 Signal 1) by the touch 418 and are mostly unaffected at the lower frequency (representing input signal 404 Signal 2) by the touch 418. That is, touching near the Signal 1 electrode 104 attenuates almost all of the voltage of Signal 1, as detected at both readout signals 402.

The graph 420 illustrates the case in which there is a touch 422 on the highly resistive sheet 102, near the electrode 104 at which the readout signal 402 Readout 2 is measured. As in graph 406, graph line 408 represents the readout signal 402 at Readout 1, and graph line 410 represents the readout signal 402 at Readout 2. The Readout 1 signal, as shown by graph line 408, is mostly unaffected by the touch 422, while the Readout 2 signal, as shown by graph line 410, is highly attenuated by the touch 422. That is, touching near the Readout 2 electrode 104 attenuates almost all of the voltage detected at the Readout 2 electrode 104.

The graph 424 illustrates the case in which there is a touch 426 on the highly resistive sheet 102, near the electrode 104 at which the input signal 404 Signal 2 is input. As in graph 406, graph line 408 represents the readout signal 402 at Readout 1, and graph line 410 represents the readout signal 402 at Readout 2. Both the Readout 1 and Readout 2 signals are highly attenuated at the lower frequency (representing input signal 404 Signal 2) by the touch 426 and are mostly unaffected at the higher frequency (representing input signal 404 Signal 1) by the touch 426. That is, touching near the Signal 2 electrode 104 attenuates almost all of the voltage of Signal 2, as detected at both readout signals 402.

The graphs of FIG. 4 illustrate that the closer a touch is to an input electrode 104, the more the signal input at that input electrode 104 is attenuated at all readout electrodes 104, and the closer a touch is to an output electrode 104, the more all input signals are attenuated at that readout electrode 104. This information can be used to derive a location of a touch anywhere within the highly resistive sheet 102 by comparing the attenuation levels of each input signal at each readout. In some embodiments, a touch location can be determined with only one readout point based on two or more input signals.

Figure 5:
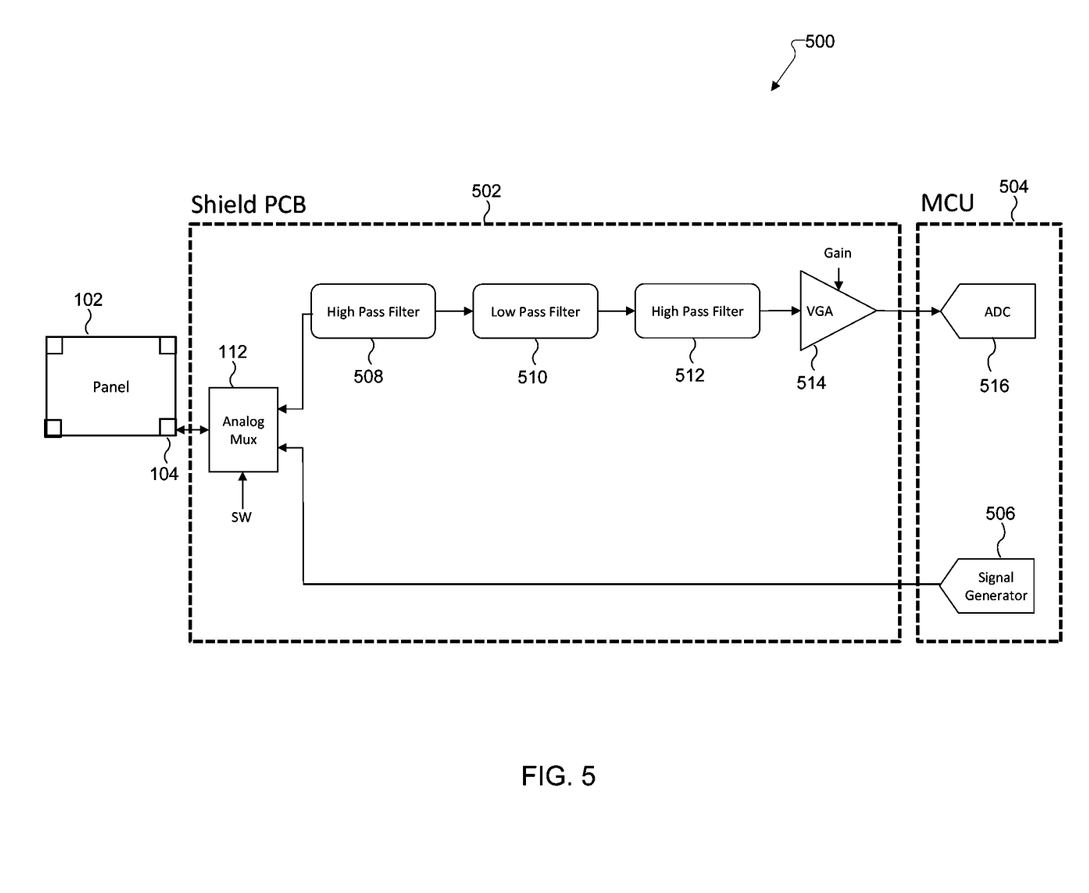
FIG. 5 illustrates an example signal pipeline of a touch sensing system according to embodiments of the present disclosure.

FIG. 5 illustrates an example signal pipeline 500 of a touch sensing system 100 in accordance with various embodiments of the present disclosure. The signal pipeline 500 could represent the functionality of a sub-controller 108 or a processor 106. For example, the components of the shield PCB 502 could include the multiplexer 112 (which could be an analog multiplexer), the signal generator 114, and the signal processing components 116. The controller 110 or processor 106 could implement the functions of microcontroller 504. Microcontroller 504 is an ARM microcontroller in this example, but it is understood that any suitable microcontroller or processor could be used. In other embodiments, the signal pipeline 500 could be implemented by the processor 106.

The signal pipeline 500 interfaces with an electrode 104 attached to the highly resistive sheet 102 of the touch sensing system 100. A duplicate of the signal pipeline 500 could be interfaced with each electrode 104 of the touch sensing system 100. The signal pipeline 500 interfaces with the electrode 104 via a multiplexer 112, which allows the signal pipeline 500 to function for both inputs and outputs. The multiplexer 112 could be controlled by a software input from the microcontroller 504. A signal generator 506 (which could include a digital-to-analog converter (DAC)) of the microcontroller 504 can supply analog input signals to the multiplexer 112. The multiplexer 112 supplies analog output signals to a series of filters 508, 510, and 512 and an amplifier 514 for signal conditioning before analog to digital conversion is performed in the microcontroller 504 by analog-to-digital converter (ADC) 516.

In this embodiment, readout signals are first supplied to a high pass filter 508, then to a low pass filter 510, and then to another high pass filter 512 in order to create a band pass filtering effect that isolates the frequency band that contains the input signals. After filtering, the readout signal is amplified at amplifier 514, which can be a variable gain amplifier (VGA). The gain input of the amplifier can, in some embodiments, be hardcoded in the firmware of the microcontroller 504.

Figure 6:
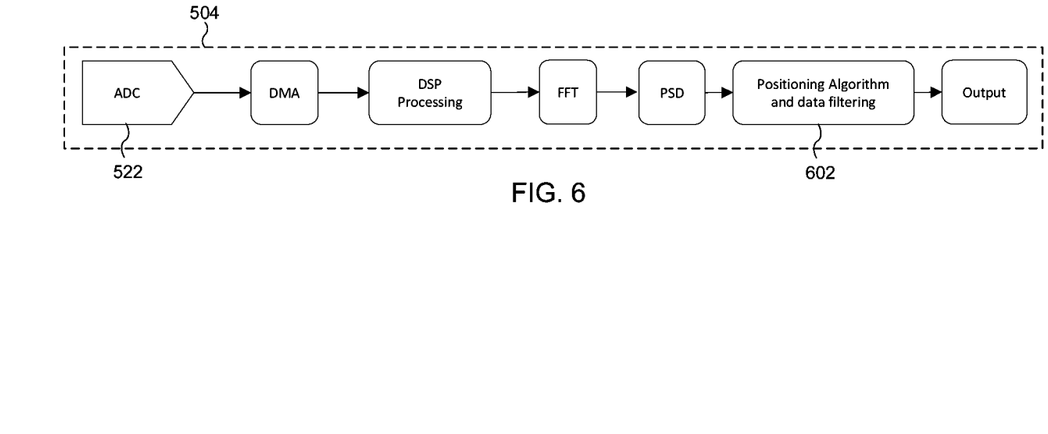
FIG. 6 illustrates an example data pipeline of the touch sensing system according to embodiments of the present disclosure.

FIG. 6 illustrates an example data pipeline of the touch sensing system 100 according to illustrative embodiments of the present disclosure. FIG. 6 includes a digital signal processing (DSP) function of the data pipeline. In some embodiments, this is implemented in the microcontroller 504 of FIG. 5 after analog-to-digital conversion by ADC 522. The DSP function of FIG. 6 separates the portions of the single readout signal that correspond to the different input signals so that they can be processed by the algorithm 602, which determines the touch location based on the relative strengths of the detected input signals.

Figure 7A:
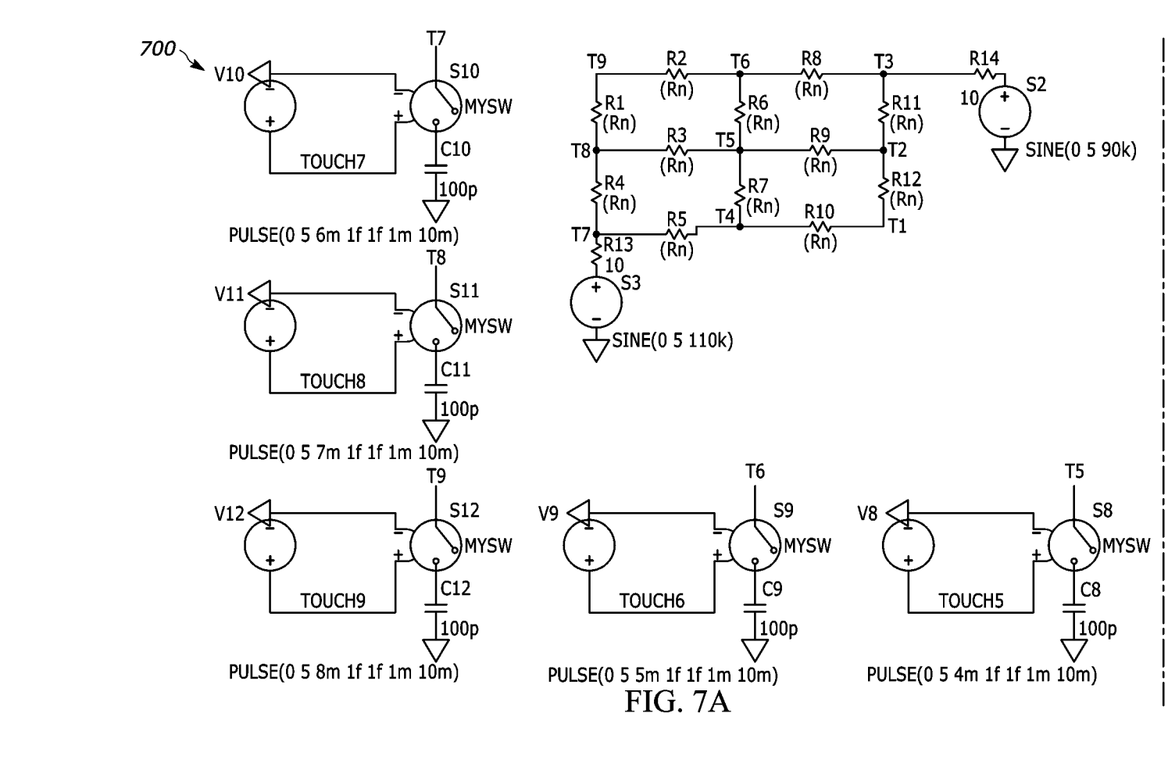
FIG. 7A illustrates an example circuit diagram that is a simulation of the touch sensing system according to embodiments of the present disclosure.

FIG. 7A illustrates an example circuit diagram 700 that is a simulation of the touch sensing system 100 according to illustrative embodiments of the present disclosure. The circuit diagram 700 models the highly resistive sheet 102 using a grid of 1 megaohm (MΩ) resistors (resistors R1-R12) which connect 9 simulated touch points T1-T9. Two input AC electric fields, which have frequencies of 90 kHz and 110 kHz, respectively, are applied at the corners of the grid, at points T3 and T7, respectively. Touches at each of points T1-T9 are simulated as a switch that shunts the signal at the respective point to ground through a 100 picofarad (pF) capacitor.

Figure 7B:
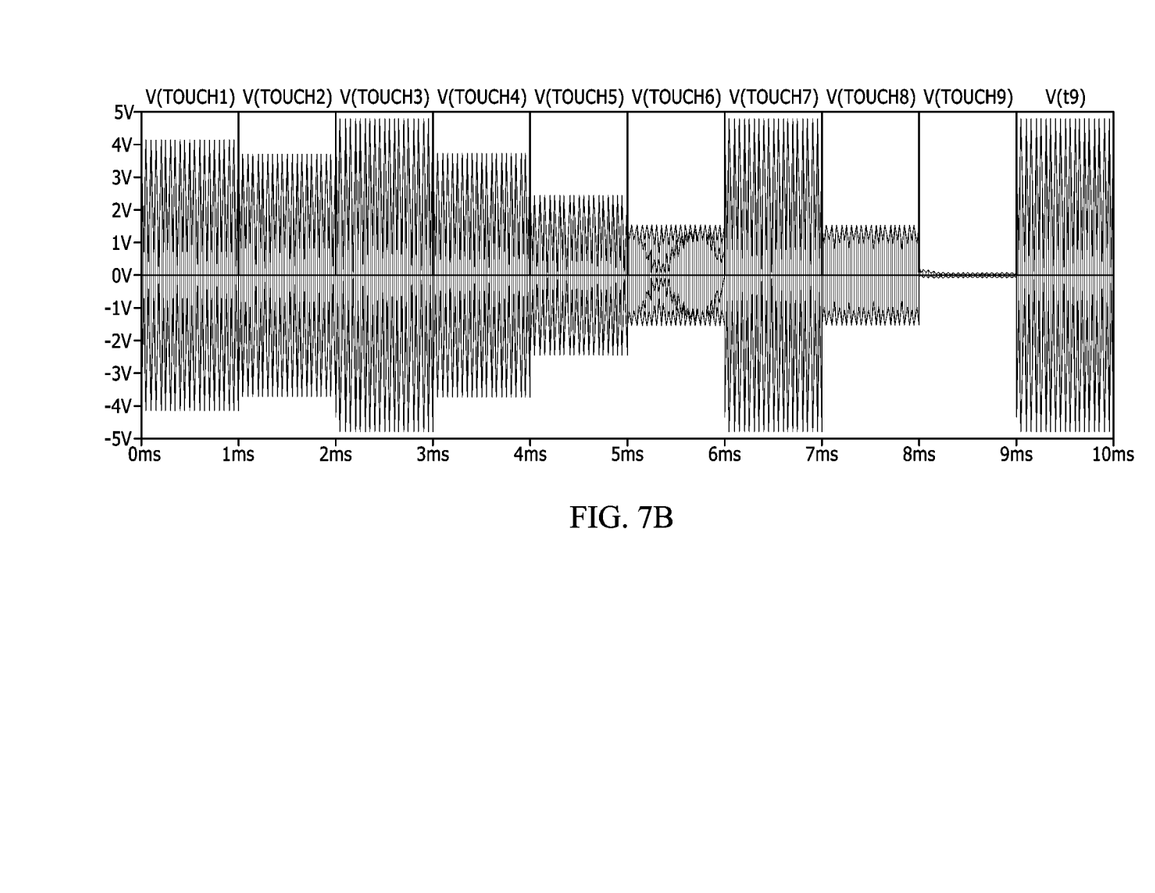
FIG. 7B illustrates simulated voltage readouts at touch point T9 of the example circuit diagram of FIG. 7A.

FIG. 7B illustrates simulated voltage readouts at touch point T9 of the example circuit diagram 700 of FIG. 7A. Each voltage measurement V(touch1) to V(touch9) represents a voltage measured at point T9 for a touch applied to points T1 to T9, respectively. In this example, a touch is simulated at each touch point T1 to T9 for 1 millisecond.

In some embodiments, the touch sensing system 100 could support multi-touch touch sensing. For example, when more than four electrodes 104 are used in the touch sensing system 100, additional input signals and additional readouts allow for higher resolution (or higher accuracy) detection of touch location, and can allow the system to differentiate between two or more simultaneous touch locations. In some embodiments, multi-touch touch sensing is supported with four electrodes 104 when multiplexing is used to switch each electrode between use as an input and as an output. This functionally allows for four input signals and four readout signals with only four electrodes 104, which can provide the accuracy to differentiate between two or more simultaneous touch locations.

In some embodiments, the touch sensing system 100 can perform pressure sensing. For example, in addition to the touch location, changes in the amount of pressure placed at the touch location can be detected based on changes in the amount of signal shunted through the user's body to ground. Touch position detection and pressure sensing can also be integrated for enabling support for use in three-dimensional (3D) touch input. An electric field induced in the highly resistive sheet 102 depends on a distance between the user's fingers and the highly resistive sheet 102, and this information can be used to enable 3D touch input. For example, repoussé, chasing, and other forms of 3D input can be supported with this combination. 3D touch interaction can include hovering, left-move, right-move, and zooming in and out. Other embodiments of the touch sensing system 100 allow for infrared sensing. For example, infrared radiation incident on the highly resistive sheet 102 could affect the electric field in the highly resistive sheet 102, and such variations in the electric field could be used to detect the infrared radiation.

Figure 8:
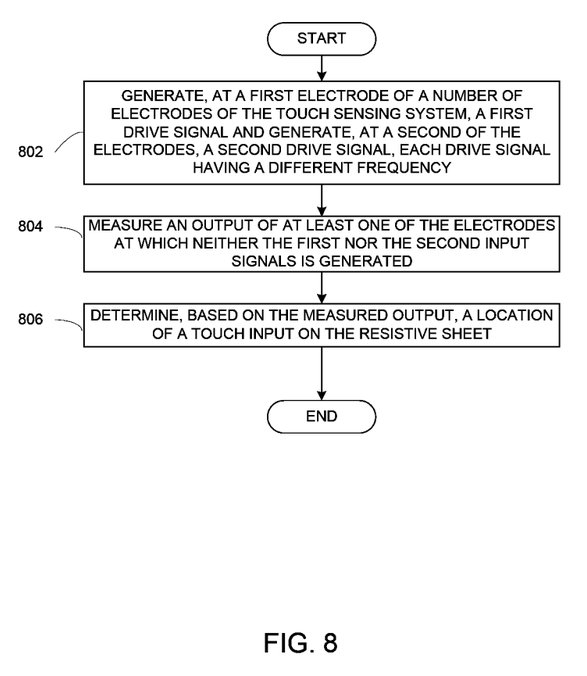
FIG. 8 illustrates an example process for touch sensing according to embodiments of this disclosure.

FIG. 8 illustrates an example process for touch sensing according to illustrative embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. In some embodiments, the method of FIG. 8 may be performed by the touch sensing system 100.

The method begins at step 802 with a processor of the touch sensing system generating, at a first electrode of a number of electrodes of the touch sensing system, a first drive signal. The processor additionally generates, at a second of the electrodes, a second drive signal. Each drive signal has a different frequency. Each of the number of electrodes is electrically coupled to an optically transmissive resistive sheet, and are disposed at an edge of the resistive sheet and spaced apart. In some embodiments, there are four electrodes that are placed at each corner of a resistive sheet having four corners, and the first and second signals are generated at electrodes that are on non-adjacent (or opposite) corners.

In some embodiments, the resistive sheet has a sheet resistance of at least 1 kΩ/sq. In some embodiments, the resistive sheet has a sheet resistance of around 1 MΩ/sq. The resistive sheet can comprise materials such as poly(3,4-ethylenedioxythiophene) polystyrene sulfonate (PEDOT:PSS), indium tin oxide (ITO), or a carbon nanotube-based thin film (CNT). In this example, the resistive sheet is comprised of PEDOT:PSS having a thickness of about 50 nm.

Each of the drive signals (e.g., the first and second drive signals generated at step 802) generates an electric field in the resistive sheet, and the touch input on the resistive sheet causes an amount of current from the electric field to be shunted to ground through a user's body via capacitive coupling. This shunting to ground reduces a voltage that can be measured at the electrodes.

Next, at step 804, the processor measures an output of at least one of the electrodes. The output is measured from at least one electrode at which neither the first signal nor the second signal is generated. These electrodes can be referred to as output electrodes. The measurement can include measuring an attenuation of the voltage of each drive signal at the at least one electrode.

Then, at step 806, the processor determines, based on the measured output, a location of a touch input on the resistive sheet. In some embodiments, an optically transmissive cover layer comprised of glass or plastic is disposed in contact with the resistive sheet, and the processor instead determines a location of a touch input on the cover layer. The cover layer can be comprised of materials including PET and glass. In some embodiments, a shield layer is disposed in contact with the resistive sheet on a side of the resistive sheet that is opposite the cover layer. The shield layer can be comprised of a second resistive sheet having a sheet resistance smaller than the sheet resistance of the resistive sheet.

In some embodiments, determining the location of the touch input on the resistive sheet includes determining, based on the measured attenuation of the voltage of each drive signal measured at respective output electrodes, a distance of the touch input from an electrode at which the output was measured. The processor then determines the location of the touch input on the resistive sheet using the determined distance from each of the electrodes.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
    a resistive sheet that is optically transmissive;
    a number of electrodes electrically coupled to the resistive sheet, the electrodes disposed at an edge of the resistive sheet and spaced apart at predetermined intervals; and
    a processor coupled to the number of electrodes and configured to:
        generate, at a first of the electrodes, a first drive signal;
        generate, at a second of the electrodes, a second drive signal, each drive signal having a different frequency;
        measure an output of at least a third of the electrodes while the first drive signal and the second drive signal are generated at the first of the electrodes and the second of the electrodes, respectively; and
        determine, based on the output, a location of a touch input on the resistive sheet.

2. The electronic device of claim 1, wherein the resistive sheet has at least one of a sheet resistance of at least 1 kΩ/sq. or a thickness of about 50 nm.

3. The electronic device of claim 1, wherein the resistive sheet comprises at least one of poly(3,4-ethylenedioxythiophene) polystyrene sulfonate (PEDOT:PSS), indium tin oxide (ITO), or a carbon nanotube-based thin film (CNT).

4. The electronic device of claim 1, wherein the processor is further configured to determine the location of the touch input on the resistive sheet by:
    determining, based on an attenuation of each drive signal measured at respective ones of the electrodes, a distance of the touch input from an electrode at which the output was measured; and
    determining, based on the determined distance from each of the electrodes, the location of the touch input.

5. The electronic device of claim 1, further comprising:
    an optically transmissive cover layer comprised of glass or plastic, the cover layer disposed in contact with the resistive sheet,
    wherein the processor is configured to determine, based on the measured output, the location of the touch input on the cover layer.

6. The electronic device of claim 1, further comprising a shield layer disposed in contact with the resistive sheet on a first side of the resistive sheet that is opposite a second side of the resistive sheet that receives the touch input, the shield layer comprised of a second resistive sheet having a sheet resistance smaller than the sheet resistance of the resistive sheet.

7. The electronic device of claim 1, wherein:
the number of electrodes comprises four electrodes;
the resistive sheet comprises four corners;
the four electrodes are placed at the four corners of the resistive sheet; and
the processor is configured to apply at least the first drive signal and the second drive signal to electrodes at non-adjacent corners of the resistive sheet.

8. The electronic device of claim 1, wherein:
each of the first and second drive signals generates an electric field in the resistive sheet;
the touch input on the resistive sheet causes an amount of current from the electric field to be shunted to ground through a user's body via capacitive coupling; and
the shunting to ground reduces a voltage that is measured at the output of the at least one of the electrodes.

9. A method comprising:
generating, by a processor at a first electrode of a number of electrodes, a first drive signal, the number of electrodes electrically coupled to an optically transmissive resistive sheet, the electrodes disposed at an edge of the resistive sheet and spaced apart at predetermined intervals;
generating, by the processor at a second of the electrodes, a second drive signal, each drive signal having a different frequency;
measuring an output of at least a third of the electrodes while the first drive signal and the second drive signal are generated at the first of the electrodes and the second of the electrodes, respectively; and
determining, based on the output, a location of a touch input on the resistive sheet.

10. The method of claim 9, wherein the resistive sheet has a sheet resistance of at least 1 kΩ/sq. or a thickness of about 50 nm.

11. The method of claim 9, wherein the resistive sheet comprises at least one of poly(3,4-ethylenedioxythiophene) polystyrene sulfonate (PEDOT:PSS), indium tin oxide (ITO), or a carbon nanotube-based thin film (CNT).

12. The method of claim 9, further comprising determining the location of the touch input on the resistive sheet by:
determining, based on an attenuation of each drive signal measured at respective ones of the electrodes, a distance of the touch input from an electrode at which the output was measured; and
determining, based on the determined distance from each of the electrodes, the location of the touch input.

13. The method of claim 9, wherein:
an optically transmissive cover layer comprised of glass or plastic is disposed in contact with the resistive sheet, and
the method further comprises determining, based on the measured output, the location of the touch input on the cover layer.

14. The method of claim 9, wherein a shield layer is disposed in contact with the resistive sheet on a side of the resistive sheet on a first side of the resistive sheet that is opposite a second side of the resistive sheet that receives the touch input, the shield layer comprised of a second resistive sheet having a sheet resistance smaller than the sheet resistance of the resistive sheet.

15. The method of claim 9, wherein:
the number of electrodes comprises four electrodes;
the resistive sheet comprises four corners; and
the four electrodes are placed at the four corners of the resistive sheet,
the method further comprising applying at least the first drive signal and the second drive signal to electrodes at non-adjacent corners of the resistive sheet.

16. The method of claim 9, wherein:
each of the first and second drive signals generates an electric field in the resistive sheet;
the touch input on the resistive sheet causes an amount of current from the electric field to be shunted to ground through a user's body via capacitive coupling; and
the shunting to ground reduces a voltage that is measured at the output of the at least one of the electrodes.

17. A non-transitory computer readable medium embodying a computer program, the computer program comprising computer readable program code that when executed causes at least one processing device to:
generate, at a first electrode of a number of electrodes, a first drive signal, the number of electrodes electrically coupled to an optically transmissive resistive sheet, the electrodes disposed at an edge of the resistive sheet and spaced apart at predetermined intervals;
generate, at a second of the electrodes, a second drive signal, each drive signal having a different frequency;
measure an output of at least a third of the electrodes while the first drive signal and the second drive signal are generated at the first of the electrodes and the second of the electrodes, respectively; and
determine, based on the output, a location of a touch input on the resistive sheet.

18. The non-transitory computer readable medium of claim 17, wherein the resistive sheet comprises at least one of poly(3,4-ethylenedioxythiophene) polystyrene sulfonate (PEDOT:PSS), indium tin oxide (ITO), or a carbon nanotube-based thin film (CNT).

19. The non-transitory computer readable medium of claim 17, wherein the computer readable program code when executed causes the at least one processing device to determine the location of the touch input on the resistive sheet by:
determining, based on an attenuation of each drive signal measured at respective ones of the electrodes, a distance of the touch input from an electrode at which the output was measured; and
determining, based on the determined distance from each of the electrodes, the location of the touch input.

20. The non-transitory computer readable medium of claim 17, wherein:
each of the first and second drive signals generates an electric field in the resistive sheet;
the touch input on the resistive sheet causes an amount of current from the electric field to be shunted to ground through a user's body via capacitive coupling; and
the shunting to ground reduces a voltage that is measured at the output of the at least one of the electrodes.

* * * * *